Oct. 2, 1956

A. L. A. MORGEN

2,764,923

ARRANGEMENTS FOR HYDRAULICALLY LIFTING
IMPLEMENTS CARRIED BY A TRACTOR

Filed Jan. 23, 1951

André L. A. Morgen
By Fraser, Myers & Manley

André L. A. Morgen
By Fraser, Myers & Manley
Atty's.

United States Patent Office 2,764,923
Patented Oct. 2, 1956

2,764,923

ARRANGEMENTS FOR HYDRAULICALLY LIFTING IMPLEMENTS CARRIED BY A TRACTOR

André L. A. Morgen, Reims, France

Application January 23, 1951, Serial No. 207,322

Claims priority, application France February 7, 1950

6 Claims. (Cl. 97—46.03)

It is known that implements carried by a tractor are frequently attached to the latter by an articulated linkage of quadrilateral form, a hydraulic ram being provided, which acts on the implement and tends to raise it.

In order to obtain a fixed level for the implement with reference to the earth, it is known to immobilize, in some manner, the piston of the ram, for example by enclosing in the ram a predetermined quantity of oil or, when the ram is permanently fed with liquid, by arranging in the ram a discharge channel which can vary in position along the axis of the said ram.

In such an arrangement, when the tractor rises over a hump on the ground, it tends to raise the implement out of the ground, because at the same time the piston of the ram forms an abutment and prevents the lowering of the implement relative to the tractor. Two serious disadvantages result from this: in the first place, the working height of the implement is not maintained, and in the second place, the pressure in the ram tends to build up to an excessive amount.

Now, in a linkage of quadrilateral type, when the implement is at work, the upper member or members of the quadrilateral are normally in compression whilst the lower member or members are in tension. On the other hand, when the tractor encounters a hump or a ridge, the implement tends to be unearthed, so that the upper member or members come under tension, whilst the lower member or members are in compression. There is thus produced, as it were, under these conditions, an inversion of the strains in the linkage members for the implement. The present invention utilises this invention to bring about a momentary discharge of the ram which allows the piston of the ram to be displaced in a direction corresponding to the lowering of the implement.

According to this invention, one of the members of the quadrilateral linkage is connected to the tractor in such a way as to cause a limited displacement of the member relative to the tractor when the tractor encounters a hump or ridge in the ground of sufficient size, said member being mechanically connected with a closing device for a discharge passage from the ram, in such a manner that this passage is closed in one of the end positions of the member (representing its normal working position) and open in the other.

Thus conceived, this arrangement still presents one disadvantage: the strains in the quadrilateral linkage are inverted in the same way when it is desired intentionally to raise the implement. Unless a special arrangement is provided, this inversion of the strains will allow the ram to discharge and the raising of the implement will become impossible.

In order to avoid this disadvantage, it is possible to provide means for preventing sufficient displacement of the said displaceable member to open the said passage from the ram, this means may be operated by a manual control, or it may be operated automatically, for example by a blocking member displaced by the implement during its rising movement.

It is also possible to provide in the mechanical connection between the said member and the closing device an uncoupling device so that displacement of the said member no longer effects a movement of the closing device.

Finally a second closing device can be added to the first one, the second device being hand-controlled in order to close the discharge passage opened by the first one.

This last arrangement is particularly advantageous because it allows the operator at will during the working of the tractor and the implement, to prevent the ram from discharging when uneven ground is encountered, in particular when the surface of the ground has slight undulations. In this way, in ploughing for example, one can obtain a levelling of the surface of the ground.

In one arrangement according to the invention, the displaceable member is pivoted to a lever which, in turn, is itself pivoted to the tractor; whenever, in normal use, the member is under compression or under tension, this lever abuts against the tractor and transmits to the tractor the stress from the bar. When the strains in the member are inverted, this lever is displaced and it moves the closing device.

In another form of the invention, the displaceable member or an extension piece thereon carries on oval slot arranged over a cylindrical pivot on the tractor; this allows the pivot to move from one extremity to the other of the oval opening when the strains in the member are inverted.

Other features of the invention will be apparent from the following description of various forms of the invention, given with reference to the accompanying drawings, in which.

Figure 1:
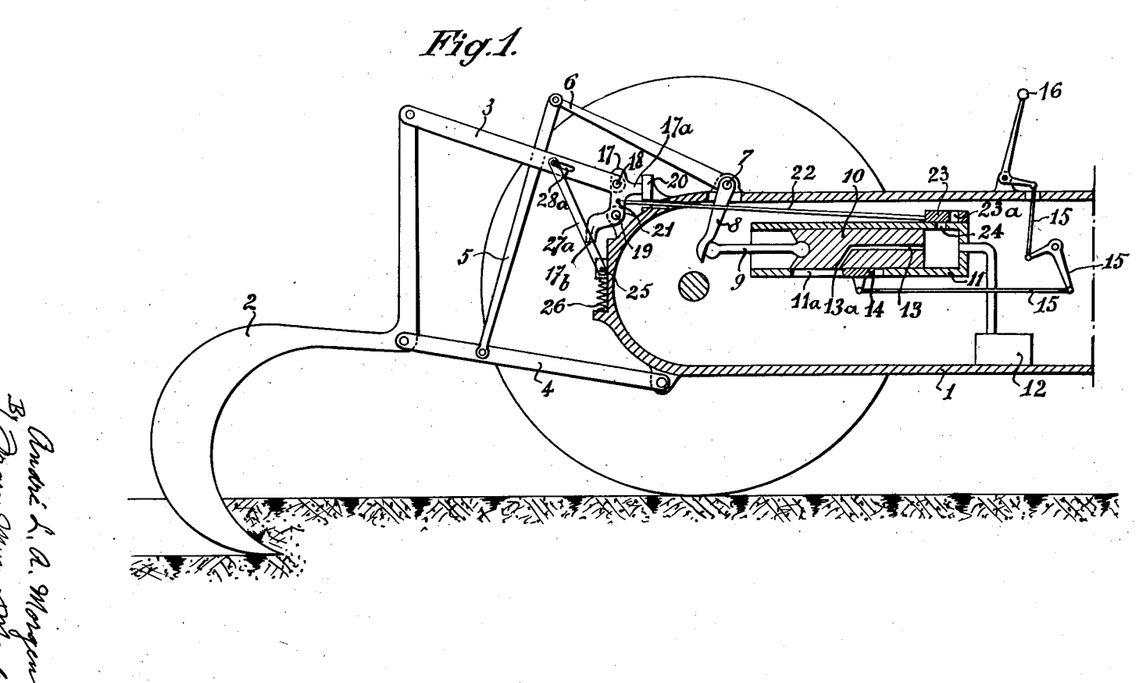
Fig. 1 shows schematically in longitudinal cross-section the rear end of a tractor provided with an arrangement according to the invention embodying a lever between one of the linkage members and the tractor.

The back of the tractor 1 shown in Fig. 1 carries an implement 2 by means of an articulated quadrilateral linkage comprising two lower linkage bars 4, normally in tension, and an upper bar 3 normally in compression. The raising of this implement is assured by two arms 6 joined by the link arms 5 to the lower bars 4, the arms 6 being attached to a pivot 7 and moved, by means of the lever 8 and the piston rod 9, by the thrust of the piston 10 of a ram cylinder 11. This ram cylinder is permanently fed by a pump 12 and the piston 10 is formed with an internal channel 13 leading out into a longitudinal slot 11a in the cylinder wall of the ram. This slot is partially closed by a kind of sliding key piece 14 which can be moved longitudinally by the system of rods 15 ending in the hand lever 16.

When the key piece 14 is moved, the piston 10 follows the movement of this key piece and comes to rest when the orifice 13a of the channel 13 is just uncovered by the key piece. Consequently the position of the implement 2 depends on the position of the lever 16 and at each position of this lever there is one corresponding position only of the implement.

According to the invention, one of the bars 3 or 4 (in the example shown the upper bar 3) is not directly pivoted to the tractor, but is connected through a lever 17 which is pivoted both at 18 to the said bar and at 19 to a pivot rigid with the tractor.

The lever 17 can make contact by a projection 17a on an abutment 20 carried on the body of the tractor. On the said lever is pivoted at 21 one of the ends of a rod 22 whose other end operates a closing device 23 capable of uncovering the end of a passage 24 provided through the wall of the cylinder 11 towards its right-hand end.

In the example shown this closing device is in the form of a slide. It will be appreciated that this closing device could equally well be in the form of a cock or valve so long as it is capable of being operated by a member such as the rod 22.

When the tractor is working on a flat surface, it is known that the upper bar 3 is under compression, that is to say that it exercises a thrust on the lever 17, a thrust which is transmitted to the tractor through the abutment 20.

When the tractor rises on a hump, the implement tends to be lifted up. Consequently, by reason of its weight and of the reaction of the ground, the bar 3 becomes under tension, and causes the rotation of the lever 17 round its pivot 19, thus moving the slide 23 and for example bringing the opening 23a provided in this slide opposite the passage 24 from the cylinder. As the piston 10 simultaneously receives a powerful thrust by reason of the weight of the implement transmitted by the link arms 5, the arms 6, the lever 8 and the piston rod 9, this piston can be displaced towards the right, thus allowing the tool to descend instead of being raised up at the same time as the tractor. The working depth is thus practically maintained constant.

In order to prevent the closing device 23 from being displaced when it is desired to raise the implement intentionally, the arrangement is completed by a moving abutment 25 intended to prevent, in this event, any displacement of the lever 17 by becoming lodged between a projection 17b of this lever and the body of the tractor. This abutment can be operated by any one of the members which move during the lifting of the implement, in such a manner as to be disposed in its lower position when the implement is lowered and in its upper position when the raising of the implement takes place. In Fig. 1, the abutment 25 is subjected to the pressure of a spring 26 tending to raise it, and moreover it is linked by a link rod for example to the bar 3 (as shown by 27a).

The upper end of the link rod 27a is arranged to slide in an elongated slot 28a.

In the position shown in the figure (the implement working at a certain depth), the position of the bar 3 is sufficiently low to enable the link rod 27a to exercise, against the spring 26, a pressure on the abutment 25 which moves this away from the space between the projection 17b and the body of the tractor. In this case the upper end of the link rod 27a is found to rest against the left hand end of the elongated slot 28a; the lever 17 is then free to be displaced and the closing device is free to function.

If the raising of the implement is commenced by moving the lever 16 towards the rear, the lever 17 at first remains free to be displaced, but so long as the implement remains in the neighbourhood of but below the surface of the soil, the forces on the bar 3 maintain the lever 17 in the abutting position against 20 and the raising action can commence.

In the course of the raising movement, the bar 3 ceases to act by its link rod on the abutment 25 and so this abutment, under the pressure of the spring 26 can slide between the projection 17b and the body of the tractor, thus immobilizing the lever 17. Thanks to the elongated slot 28a, the raising movement can continue until the implement is completely raised.

Figure 2:
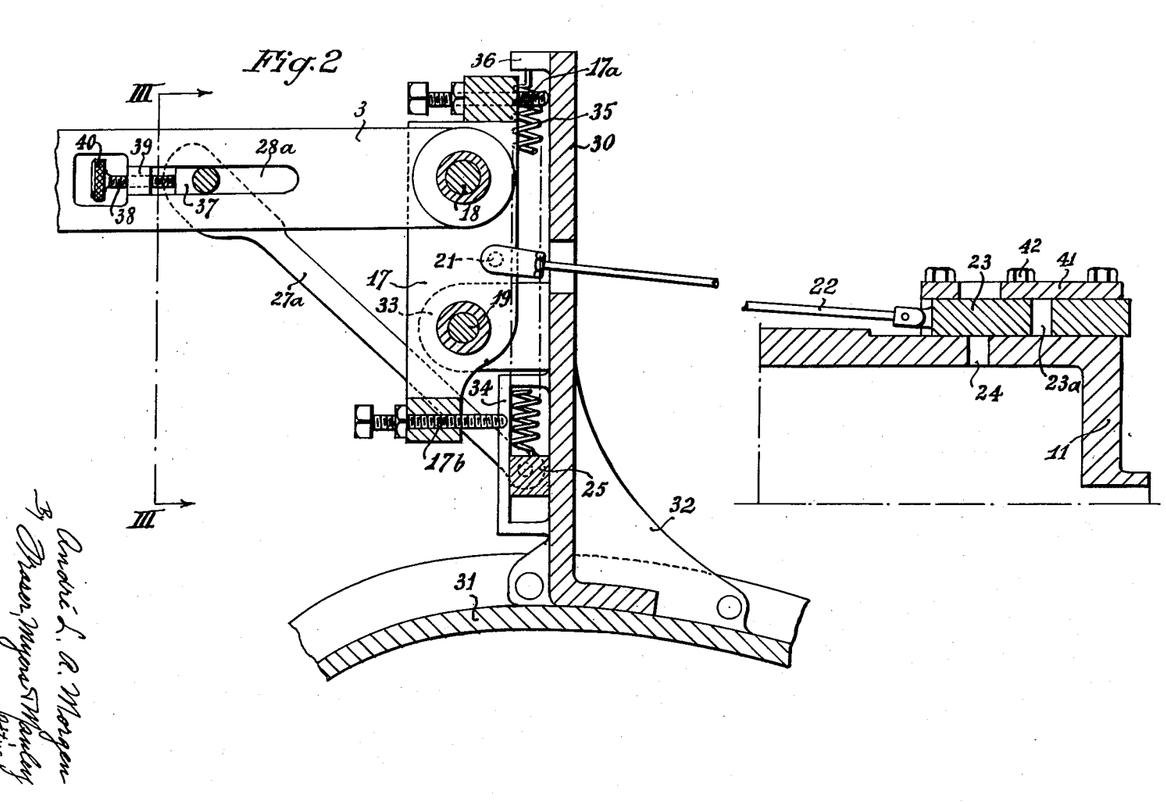
Fig. 2 is a partial view in longitudinal cross-section on the line II—II of Fig. 3 of a practical embodiment of this arrangement.
Figure 3:
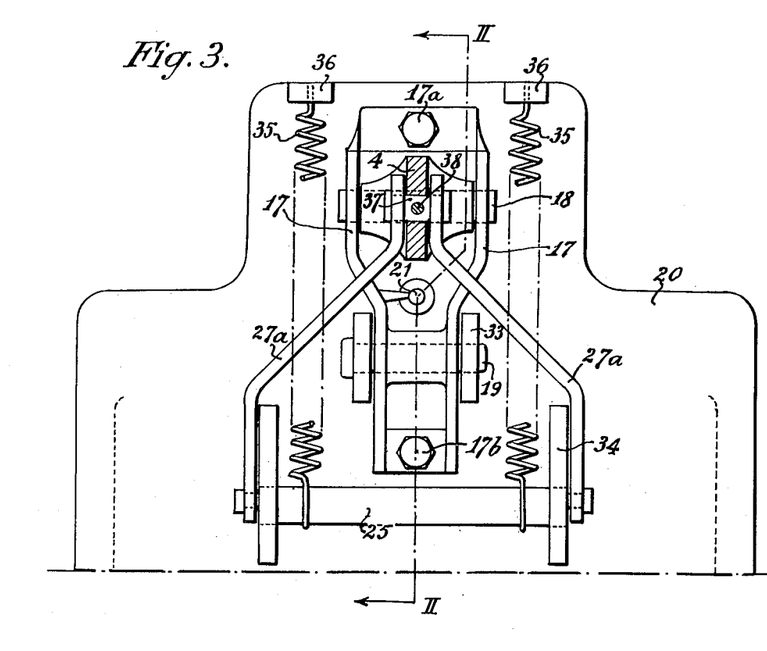
Fig. 3 is a view on the line III—III of Fig. 2.

In the practical embodiment shown in Figs. 2 and 3, the arrangement is mounted on a plate 30 vertically disposed and fixed by means of brackets 32 to the casing 31 of the back axle of the tractor. The pivot 19 is mounted between lugs 33 fixed to the plate 30. The lever 17 is in the form of a yoke, and at its two ends the projections 17a and 17b take the form of bolts which permit regulation of the conditions of contact of this lever both on the plate 30 and on the abutment 25. This latter element is constituted by a bar 25 of rectangular section which can move vertically in two guideways 34 fixed parallel with the lugs 33 on the plate 30.

For the compressed spring 26 of Fig. 1 are substituted two tension springs 35 placed at each side of the lever 17, one end of these springs being fixed to the bar 25 and the other to a lug 36 integral with the upper part of the plate 30.

The link rod 27a, also of double form, is pivoted at one end to the ends of the bar 25 and at the other end in the slot 28a in the bar 3, a slot which is preferably adjustable in length to vary the position at which the bar 3 starts to exercise a pressure directed downwardly on the abutment 25 through the link rods 27a. The regulation of the length of the slot 28a is obtained by means of a sliding member 37 on which works the extremity of a screw 38 engaged in a nut 39 fixed in the extension of the slot 28a. The knurled button 40 allows the screw 38 to be turned and thus to displace the sliding member 37.

The slide 23 is held in contact with the cylinder 11 by a plate 41 fixed by means of screws 42 in the lateral edges of the housing for the slide.

Figure 4:
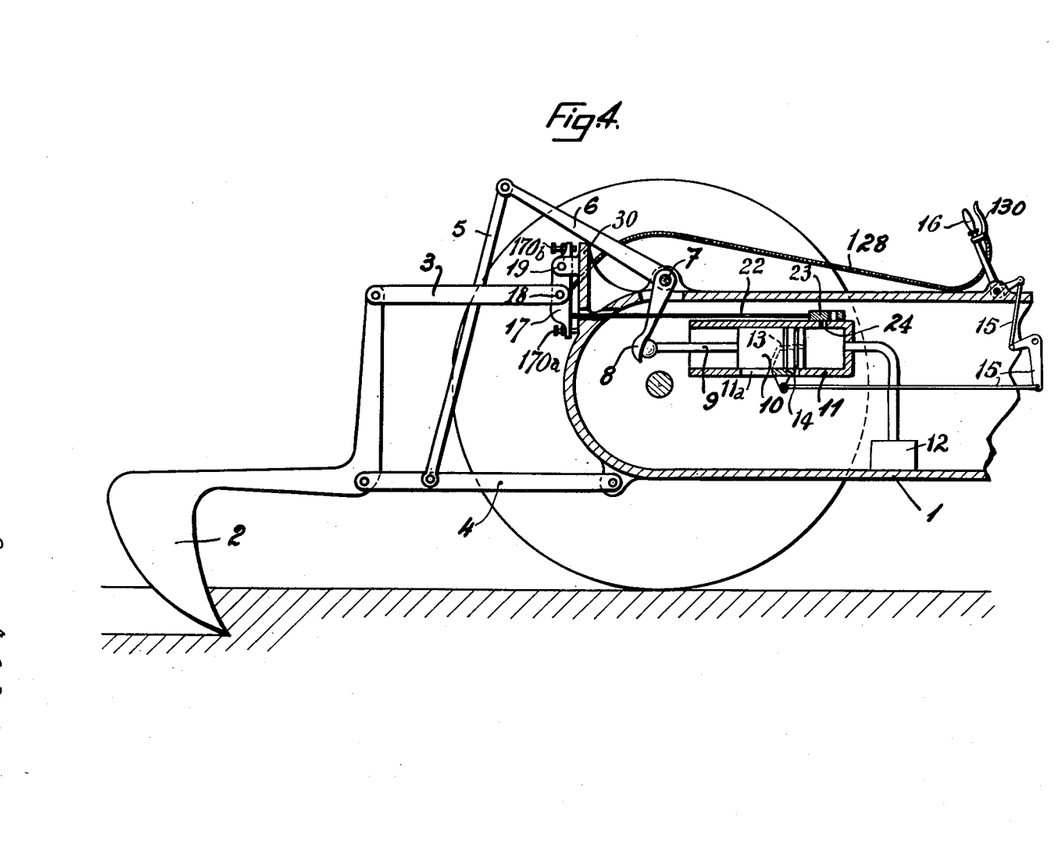
Fig. 4 is a cross-section analogous to Fig. 1 of a modified embodiment of the invention in which the connection between the displaceable member of the linkage and the closing device is capable of being uncoupled.
Figure 5:
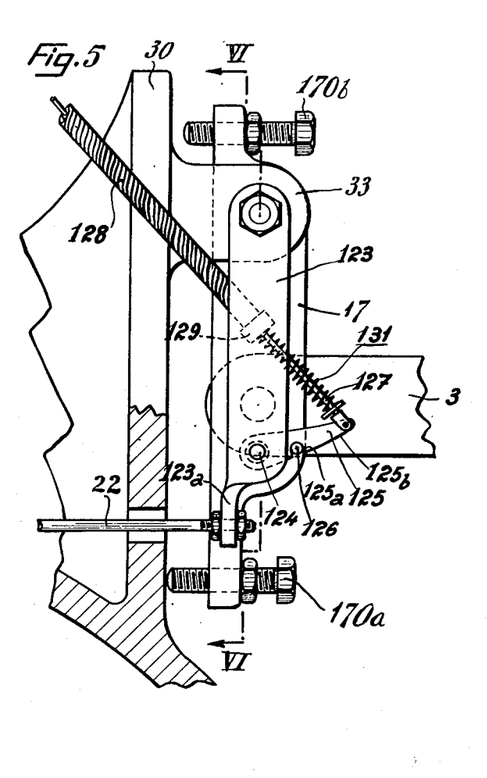
Fig. 5 is a detail on a larger scale of this form of the invention.
Figure 6:
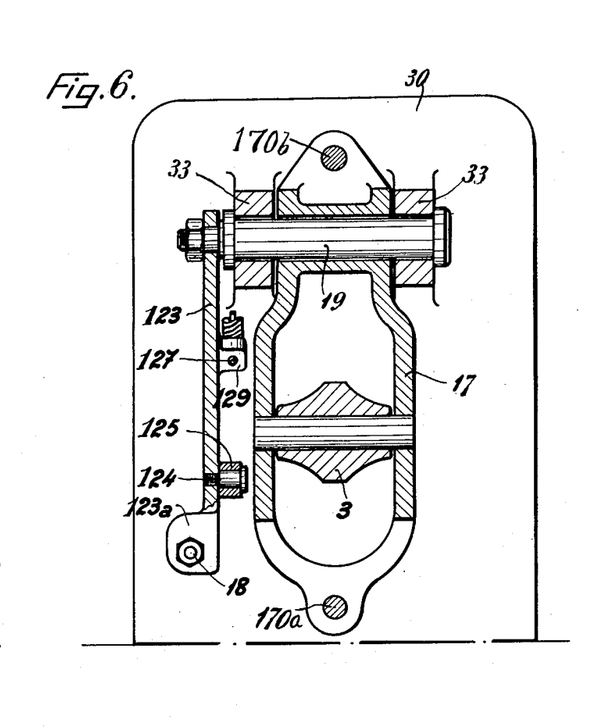
Fig. 6 is a section on the line VI—VI of Fig. 5.

In the form illustrated in Figs. 4 to 6, the general arrangement of the implement of the tractor and of the system for raising the implement is similar to that shown in Fig. 1, but in this case the lever 17 carrying projections 170a and 170b and the rod 22 can be disconnected at will in such a manner that the implement 2 can be raised to the extent desired by the ram 11. This result can be obtained in the manner shown in detail in Figs. 5 and 6.

The pivot 19 around which the lever 17 rotates swivels in the lugs 33 of the plate 30. At the end of this pivot is keyed a lever 123 which on its side facing the lever 17 carries projecting therefrom a little pivot 124 on which is pivoted a finger 125. This finger is provided with a notch 125a which is adapted to engage round a pin 126 projecting from the side face of the lever 17. The finger 125 can be operated by means of a cable 127 sliding in a sheath 128 the extremity of which is supported by a lug 129 fixed at an angle against the side of the lever 123 facing the lever 17. A spring 131 surrounding the cable and in compression between the lug 129 and the extremity of the finger 125 constrains the latter in the absence of any pull exercised by the cable, to make contact against the pin 126. The end of the rod 22 is fixed on a projection 123a at the end of the lever 123.

As can be seen in Fig. 4, the sheath and the cable are carried to a hand grip 130 preferably fixed on the hand lever 16.

The arrangement which has just been described functions as follows:

When no pull is exerted on cable 127, the spring 131 maintains the notch 125a interlocked with the pin 126, and so the lever 123 moves at the same time as the lever 17 and in consequence the closing device 23 can be operated by this lever, particularly in the case of the tractor riding over a hump.

When it is desired to lift the implement, at the same time as the hand lever 16 is moved to do this operation, the hand grip 130 is moved to exert a pull on cable 127, thus disengaging the notch 125a and the pin 126. Under these conditions, the position of the closing device 23 is independent of that of the lever 17; this closing device remains shut and the lever 17 is carried round by the rising movement of the implement until the abutment 170b comes into contact with the plate 30.

When the implement is raised up and the hand grip 130 has been released, the spring 131 forces the edge 125b of the finger 125 which is in the form of an incurving slope against the pin 126. When the descent of the implement is intentionally brought about by movement of the lever 16 without touching the hand grip 130, this pin slides along the edge 125b and automatically falls back into the notch 125a. The coupling of the lever 17 with the closing device is thus re-established automatically when the implement is brought back into its working position.

Figures 7, 8:
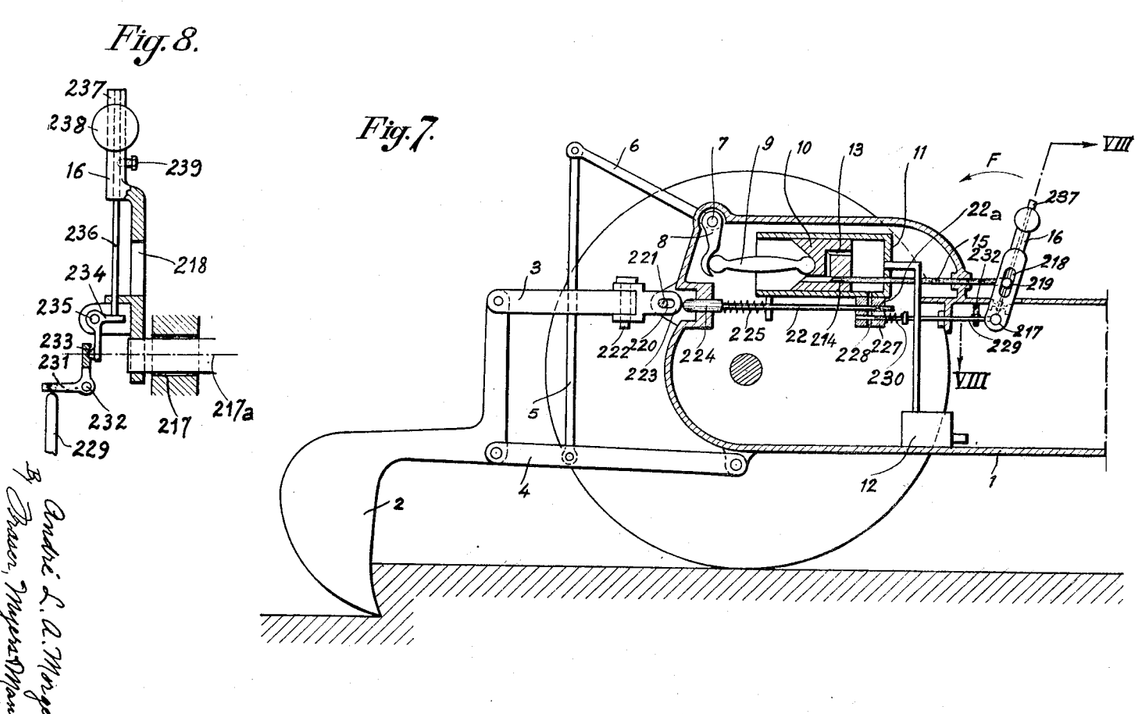
Fig. 7 is a diagrammatic cross-section analogous to Fig. 1 of another embodiment of the invention in which the displacement of the member is effected by means of an oval slot.
Fig. 8 shows one possible constructional form of the control lever for the hydraulic ram, and is a cross-section on a larger scale following the line VIII—VIII of Fig. 7, assuming the lever to have been disconnected from the rod 15 and folded down horizontally.

In the embodiment shown in Fig. 7, the ram, comprising the piston 10 and the cylinder 11, is of the type having a discharge opening with variable position. In effect, the channel 13, provided in piston 10, opens laterally into a bore 214 through the piston, parallel with the axis of the cylinder 11. In this bore is slidably arranged the rod 15, the inner end of which is chamfered and plays the same part as the key piece 14 of Fig. 1. As before, the rod 15 is moved by means of a lever 16 which can rotate round the pivot 217. To this end, the lever 16 carries an elongated slot 218 in which can slide a button 219 placed at the outer end of the rod 15.

Normally, under the action of its weight and the reaction of the earth, the implement 2 tends to drop down, as previously mentioned, and through the link arms 5 and the arms 6 and the lever 8, the implement exerts on the piston 10 a thrust towards the right. The oil, which is permanently circulated by the pump 12 and introduced into the cylinder 11, tends on the other hand to displace this piston towards the left. Equilibrium is established when the discharge opening of the channel 13 where it comes out into the bore 214 is in a position where it is just clear of the extremity of the rod 15. If the rod 15 is moved towards the left, this opening becomes closed and, under the action of the oil pressure, the piston 10 is moved an equal distance towards the left until the opening is again uncovered. The oil pressure then falls and the piston comes to a stop. The oil, escaping towards the rear through the bore 214 falls again into the casing of the tractor 1 and is taken up once more by the pump 12.

If on the other hand the rod 15 is displaced towards the right, the opening of the channel 13 into the bore 214 remains uncovered until, under the action of the weight of the implement and of the reaction of the earth, the implement 2 becomes lowered and displaces the piston 10 towards the right until it reaches the position where this opening is just uncovered. In effect, as soon as this opening tends to be closed, the pressure of the oil rises in the ram and pushes the piston towards the left.

When the implement is working in the soil, the bar 3 is under compression and the bars 4 are under tension. The bar 3 is rotatably mounted on the tractor through an oval slot 220 mounted on a pivot 221. In the example shown and in order to allow if need be a twisting of the implement 2, this bar carries a supplemental pivot whose axis 222 is perpendicular to the pivot 221, an arrangement which does not alter the possibility of movement of this bar round the pivot 221.

Figures 9, 10:
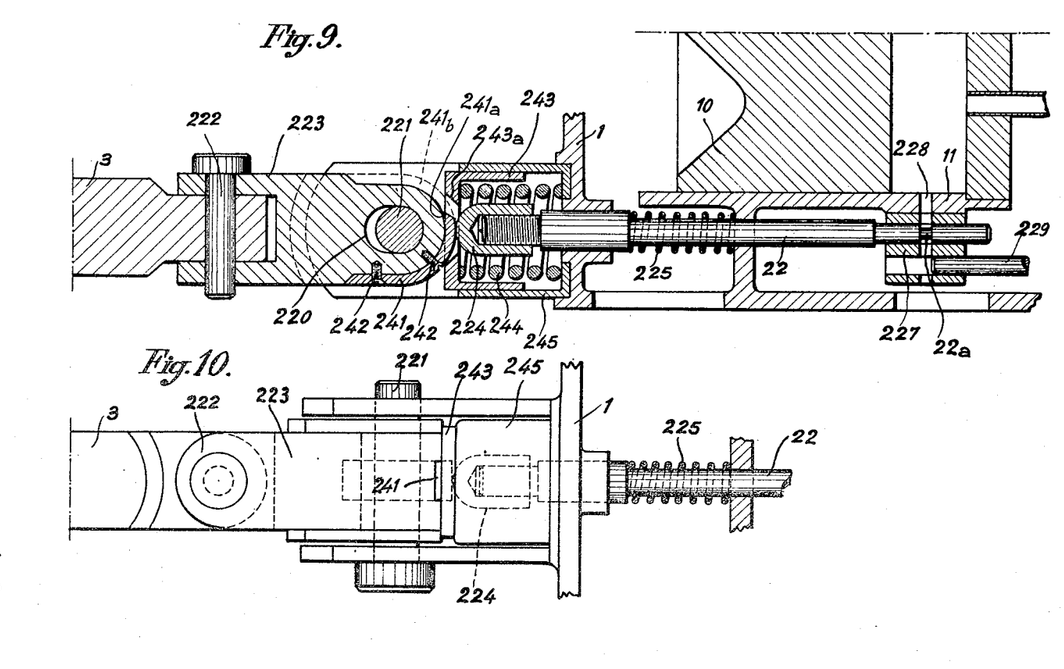
Fig. 9 is a cross-section on a larger scale of part of a preferred form of the arrangement shown in Fig. 7.
Fig. 10 is a plan view from above of part of the mechanism shown in Fig. 9.

The projection 223 on the bar 3 is in contact with a push rod 224 acted on by a return spring 225, this push rod 224 forming a prolongation of the rod 22 which itself acts as a slide in the case 227 attached to the cylinder 11 (see also Fig. 9). This case 227 is pierced by a passage 228 which opens out into the inner chamber of the cylinder. The rod 22 is provided with a waisted portion 22a which, when it is positioned opposite the passage 228 permits the movement of oil through this passage whilst in every other position of this rod, the passage is closed.

The passage 228 can moreover be closed by an auxiliary closing device comprising a rod 229 sliding in the case 227 and capable of being controlled directly by the operator. This rod 229 is subjected to the action of a return spring 230 which tends to move it towards the right (Fig. 7) and, as can be seen in Fig. 8 which illustrates one of the possible ways of mounting it, it comes into contact at its other end with one of the arms of a crank 231 pivoted on a vertical axis 232 integral with casing 1. The other arm of this crank, provided with a recess, is in contact with a spherical boss 233 carried on one of the arms of a second crank 234 rotatably mounted on a pivot 235 on the operating lever 16. The axis of rotation 235 is chosen in such a way that the spherical boss 233, when in its stationary position, is on the geometrical axis 217a of the pivot 217 of the lever 16.

A push rod 236 can operate on the upper arm of the crank 234, this push rod ending in a button 237 projecting above the handle 238 of the hand operating lever 16.

It can easily be seen that by pushing on the button 237, whatever the position of the lever 16 may be, the rod 229 is moved towards the left as shown in Fig. 7, thus assuring the blocking of the passage 228. This position of the rod 229, causing the permanent blocking of the passage 228, can be held by any sort of holding member capable of restraining the movement of the push rod 236. This member 239 can be, for example, a locking screw or a spring catch.

The functioning of the arrangement which has just been described is as follows:

When the implement is working, that is to say in the position shown in Fig. 7, the bar 3 being in compression, the pivot 221 is in contact with the left hand end of the oval slot 220, and so the push rod 224 is subjected to pressure from this bar. The passage 228 is thus closed and the implement is fixed in position relative to the tractor. In effect, the weight of the implement and the reaction of the earth exercise, through the link arms 5, the arm 6, the pivot 7, the lever 8 and the piston rod 9, a pressure on piston 10, which however cannot be displaced.

When the tractor rides over a bump, the bar 3 becomes under tension and ceases to act on the push rod 224 which, under the action of the spring 225, is displaced towards the left, drawing with it the rod 22 and this brings the waisted portion 22a opposite the passage 228. The cylinder 11 is thus allowed to discharge, and this allows the piston 10 to be displaced towards the right under the pressure of the rod 9. At this moment, the link arms 5 cease to raise the implement and the latter can drop down relatively to the tractor, that is to say can practically maintain its working depth whilst if the piston 10 had remained stationary, this implement would have been raised up out of the ground.

As soon as the bump has been cleared and the tractor again reaches flat ground, the bar 3 again becomes under compression; it acts on the push rod 224 and the passage 228 is again closed.

In order to raise the implement intentionally, the button 237 is pressed down at the same time as the lever 16 is rotated in the sense of the arrow F. Although at a certain stage in the raising movement (practically speaking at the time when the implement leaves the ground), the bar 3 ceases to be under compression and becomes under tension, the discharge passage, which would otherwise be opened, is completely closed by the displacement of the rod 229 with the result that the raising movement can be effected.

Fig. 9 shows a preferred form of such an arrangement. The end of the bar 3 (or of its prolongation 223) which can rotate round the pivot 221, and which is in contact with the push rod 224, is of semi-cylindrical form and is provided with a cam 241 fixed for example by means of screws 242. The push rod 224 itself is screwed on to the end of the rod 22. These two members 241 and 224, which can be damaged by wear or shocks, are thus easily replaceable.

The end of the bar 3 (or of the member 223) makes contact, not only on the push rod 224, but also through a cap 243 on a spring 244 bearing against the tractor and concentric with the push rod 224. The cap 243 is provided centrally with an opening 243a which allows the passage therethrough of the cam 241. This cap slides in a cylinder 245 also concentric with the push rod 224 and fixed to the tractor.

When the bar 3 becomes under compression, it has to deform both the springs 225 and 244 to displace the rod 22. Thus the shock of the action of this bar on the push rod is lessened.

Conversely, as soon as the strains in the bar 3 come to an end prior to being inverted, the bar 3 is pushed back by the spring 244 and this allows the light spring 225 to displace the rod 22 and to put the ram into discharge. With this modification, the sensitivity and adaptability of this arrangement are enhanced.

According to the modification shown in Fig. 9, the cam 241 is cut short at 241a instead of being prolonged along the dotted line 241b round the whole end periphery of the member 223.

If the position of the discontinuity 241a is suitably chosen, when the implement is intentionally raised, the push rod 224 can be freed from the action of the cam 241 just at the stage where the strains in the bar 3 are inverted. As shown in Fig. 9, this push rod will at that stage be displaced a little to the left, that is to say the waisted portion 22a will pass the end of the passage 228 and this will again close this passage. The raising movement can then proceed automatically.

However, one must take into consideration the difficulty of regulating the position of the discontinuity 241a and moreover this automatic closing of the passage 228 at the moment when the strains in the bar 3 are inverted in the course of raising the implement, can hardly be obtained except for a pre-determined implement and on level ground. That is why it is preferable during the raising movement, to block the channel 228 by hand control by means of rod 229. As this closing can be obtained at any moment during the work, one can prevent the position of the implement 2 from being sensitive to variations of the position of the tractor due to fluctuations of the terrain. The linkage of the implement to the tractor is thus rendered rigid, enabling one to avoid, for example in the case of slight undulations of the terrain, a continual variation of the position of the implement.

What I claim is:

1. In a tractor carrying an earth-moving implement pivotally connected thereto by a quadrilateral linkage, a hydraulically operated device for raising and regulating the working height of the implement relatively to the earth, said device comprising a continuously liquid discharging pump, a ram having a cylinder with a piston therein delimiting a pressure chamber, said cylinder having an intake port connected with the discharge end of the pump, a discharge passage for the normal continuous discharge of liquid, and also a discharge port in the vicinity of the intake port opening out into said pressure chamber, said piston having a passage therein, one end of said passage opening out into said pressure chamber and the other end opening out into said discharge passage, means movable parallel to the axis of said piston for obturating at least partly the passage therein, thereby allowing pressure to build up in said pressure chamber, a movable closing device for said discharge port, means for operating said closing device comprising a member connected to one of the arms of the quadrilateral linkage and to the tractor for allowing both pivotal and translational motion of said arm relatively to the tractor, abutting means for limiting the translational displacement of said arm to two limiting positions relatively to the tractor corresponding respectively to a pushing and a pulling action of said arm on said member, and mechanical means between said closing device and said arm for setting said closing device into obturating position relatively to said discharge port in one of the limiting positions of said arm and for setting said closing device into opening position relatively to said discharge port in the other limiting position of said arm.

2. The combination according to claim 1, further comprising controllable means for keeping said discharge port obturated even when said arm exerts on said member an action corresponding to the setting of the closing device into opening position.

3. The combination according to claim 2, wherein said controllable means include a further movable closing device for said discharge port, and hand actuated means for controlling said further closing device.

4. The combination according to claim 1, wherein the member connected to one of the arms of the quadrilateral linkage and to the tractor is a link, two spaced points of which are pivotally connected respectively to the tractor and to the arm of the quadrilateral linkage and two abutments in the path of movement of said link for limiting the displacement thereof.

5. The combination according to claim 1, wherein the member connected to one of the arms of the quadrilateral linkage and to the tractor is a slide, two spaced points of which are pivotally connected respectively to the tractor and to the arm of the quadrilateral linkage, one of said pivotal connections comprising a fixed pivot and an elongated slot in the slide, the end of the slot providing the two limiting positions of displacement of the slide.

6. The combination according to claim 5, wherein the mechanical means for operating the closing device comprises a push rod and a spring adapted to urge said push rod into contact with the end of the slide.

References Cited in the file of this patent

UNITED STATES PATENTS

| 2,118,180 | Ferguson | May 24, 1938 |
|---|---|---|
| 2,118,181 | Ferguson | May 24, 1938 |
| 2,394,210 | Sherman | Feb. 5, 1946 |
| 2,437,875 | Chambers et al. | Mar. 16, 1948 |
| 2,521,503 | Clark | Sept. 5, 1950 |
| 2,611,306 | Strehlow et al. | Sept. 23, 1952 |
| 2,611,307 | Strehlow et al. | Sept. 23, 1952 |
| 2,621,575 | Berg | Dec. 16, 1952 |

FOREIGN PATENTS

| 988,477 | France | May 2, 1951 |
|---|---|---|
| 988,478 | France | May 2, 1951 |